United States Patent
Cavanagh et al.

(10) Patent No.: US 8,984,193 B1
(45) Date of Patent: Mar. 17, 2015

(54) LINE SPEED SEQUENTIAL TRANSACTION PACKET PROCESSING

(75) Inventors: Edward T. Cavanagh, Norristown, PA (US); Arun Shah, Lansdale, PA (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 11/879,355

(22) Filed: Jul. 17, 2007

(51) Int. Cl.
*G06F 13/42* (2006.01)

(52) U.S. Cl.
USPC .......................................... 710/105; 710/112

(58) Field of Classification Search
USPC .................... 710/29–35, 104–106, 305–307, 710/313–315, 112–119
See application file for complete search history.

(56) References Cited

U.S. PATENT DOCUMENTS

| | | | |
|---|---|---|---|
| 7,096,308 B2 * | 8/2006 | Main et al. ..................... | 710/315 |
| 2005/0259651 A1 * | 11/2005 | Yashima ....................... | 370/389 |
| 2007/0088873 A1 * | 4/2007 | Oshikiri et al. ................ | 710/58 |

* cited by examiner

*Primary Examiner* — Raymond N Phan
(74) *Attorney, Agent, or Firm* — Richard J. Gregson

(57) ABSTRACT

Methods and systems for processing transaction packets at a serial interface are disclosed. The method includes receiving transaction information at a serial interface. The method further includes executing one or more pipelined operations based on the transaction information, where the operations relate to processing of the transaction packet. The method is performed such that the serial interface is configured to send and receive transaction packets at a line speed of the serial bus.

26 Claims, 11 Drawing Sheets

LINE SPEED SEQUENTIAL TRANSACTION PACKET PROCESSING

CROSS REFERENCE TO RELATED APPLICATION

The present application is related to another U.S. patent application, entitled "Write Latency Reduction Method" filed on the same day as this application. The entire disclosure of the related application is hereby incorporated by reference.

TECHNICAL FIELD

The present disclosure relates to transaction processing at a serial data interface. More particularly, the present disclosure relates to line speed sequential transaction packet processing at a serial data interface.

BACKGROUND

In multiprocessor computing environments and other complex computing systems, high frequency, high throughput data communication buses are necessary to avoid latencies incurred in moving data among components of a computing system, such as processors, memories, and other peripheral devices. Many modern systems use high speed serial communication channels as system buses to transmit data among the components of the system.

One such high speed serial communication channel is a PCI Express system bus. PCI Express system buses require a PCI Express compatible interface associated with each component to which the bus connects. The interface sends and receives data from the system components connected to the PCI Express bus. To do so, the interface must send and receive transaction packets on the bus and manage the parallelization/serialization of that data. The interface must also determine the type of transaction to be performed using header information contained in the received data, or must prepare transaction packets for other systems/interfaces to decode.

Many serial interfaces implement a single finite state machine controller which, using the header information, distributes commands based on the transaction to be performed based on the transaction packet. Such serial interfaces generally receive a serial transaction packet in its entirety, then process the header information contained in the packet and manage the data in the packet according to the decoded header information. The header decoding and/or data management can consume a number of system clock cycles to accomplish in the finite state machine controller, which can cause delay in processing the transaction packet.

An example operational flow of an existing serial interface state machine controller is illustrated in FIGS. 1 and 2. In such an existing system, header receipt, data receipt, data processing, and data management steps occur sequentially, introducing latency into the system based on the processing time for the interface to decode the header and generate data routing signals.

Certain serial bus protocols do not prohibit sending or receiving a transaction on each bus clock cycle. For example, a PCI Express system bus may operate using a two nanosecond clock cycle, and may hold a separate transaction on each clock cycle. Systems using a slow-processing finite state machine controller may not be able to support such line speed bus activity. This is because certain transactions can take more than one bus clock cycle to decode the header information and appropriately route the data in the transaction packet. In these cases, latency may need to be introduced into the system, such as by storing and delaying processing of an inbound transaction packet, or by introducing an idle character onto the bus. Adding latency to the system bus lowers the maximum throughput, or bandwidth, at the interface.

For these and other reasons, improvements are desired.

SUMMARY

In accordance with the present disclosure, the above and other problems are solved by the following:

In a first aspect, a method for processing transaction packets received on a serial bus are disclosed. The method includes receiving transaction information at a serial interface. The method further includes executing one or more pipelined operations based on the transaction information, where the operations relate to processing of the transaction packet. The method is performed such that the serial interface is configured to receive transaction packets at a line speed of the serial bus.

In a second aspect, a serial interface is disclosed. The serial interface includes a plurality of independent pipelined logical modules. The logical modules are configured to coordinate and execute one or more operations based on header information in each transaction packet received on a serial bus. The logical modules include a header processing module configured to determine the size of the header information. The logical modules further include a command analysis module configured to determine a type of transaction to be performed. The logical modules also include a data direction module configured to direct data from the transaction packet to an inbound data buffer. The serial interface is configured to receive transaction packets at line speed with respect to the serial bus.

In a third aspect, a method of processing transaction packets for transmission on a serial bus is disclosed. The method includes executing one or more pipelined operations relating to forming a transaction packet. The method also includes transmitting the transaction packet from a serial interface onto the serial bus. The method is performed such that the serial interface is configured to transmit transaction packets at a line speed of the serial bus.

In a fourth aspect, a serial interface is disclosed. The serial interface includes a plurality of independent pipelined logical modules. The logical modules coordinate to execute one or more operations to form a transaction packet to be transmitted on a serial bus. The logical modules include a header processing module configured to generate header information for a serial transaction packet. The logical modules also include an outbound data buffer configured to receive and store data for transmission in the serial transaction packet. The logical modules further include a register system configured to store formed transaction packets based on the header processing module and the outbound data buffer. The serial interface is configured to transmit transaction packets at line speed with respect to the serial bus.

In a fifth aspect, a method of processing transaction packets at a serial interface is disclosed. The method includes receiving transaction information at a serial interface. The method also includes executing one or more pipelined operations based on the transaction information, the operations relating to processing of a transaction packet. The method is performed such that the serial interface is configured to send and receive transaction packets at a line speed of the serial bus.

In a sixth aspect, a serial interface is disclosed. The serial interface includes a plurality of independent pipelined logical modules. The logical modules coordinating to execute one or more operations based on header information in each transaction packet received on a serial bus. The logical modules include a register system configured to store at least one transaction packet. The logical modules include a header processing module configured to determine header information associated with the transaction packet. The logical modules also include a data direction module configured to direct data from the transaction packet to a data buffer based on the header information. The serial interface is configured to send and receive transaction packets at line speed with respect to the serial bus.

In a seventh aspect, a computer readable medium having computer-executable instructions for performing steps to process transaction packets at a serial interface is disclosed. The steps include receiving transaction information at a serial interface. The steps also include executing one or more pipelined operations based on the transaction information, the operations relating to processing of a transaction packet. The steps are performed such that the serial interface is configured to send and receive transaction packets at a line speed of the serial bus.

DETAILED DESCRIPTION

Figure 1:
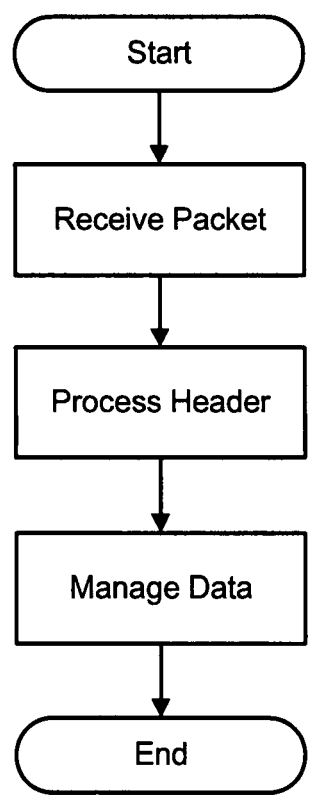
FIG. 1 illustrates prior art systems and methods for transaction packet processing.

Various embodiments of the present disclosure will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits.

In general, the present disclosure relates to transaction processing at a serial data interface, and processing transactions received at that interface at "line speed", i.e. such that the serial data interface can process transactions as fast as those transactions can occur on a serial communication channel associated with that interface.

The present disclosure relates to a variety of serial communication channels and associated serial data interfaces. One example of an interface and communication channel usable in accordance with the present disclosure is a PCI Express interface and associated PCI bus. The PCI Express interface must recognize and manage inbound or outbound memory read or write transactions, inbound or outbound messages, or other transactions defined in the PCI Express specification, available from the PCI Special Interest Group ("PCI-SIG") at http://www.pcisig.com/specifications/pciexpress/specifications/. To avoid bandwidth reduction and other latency-related issues, a PCI Express interface operable in accordance with the present disclosure is configured to be able to send or receive a transaction packet at line speed of the PCI Express bus, and is not delayed by packet processing or other operations occurring at the interface.

Figure 3:
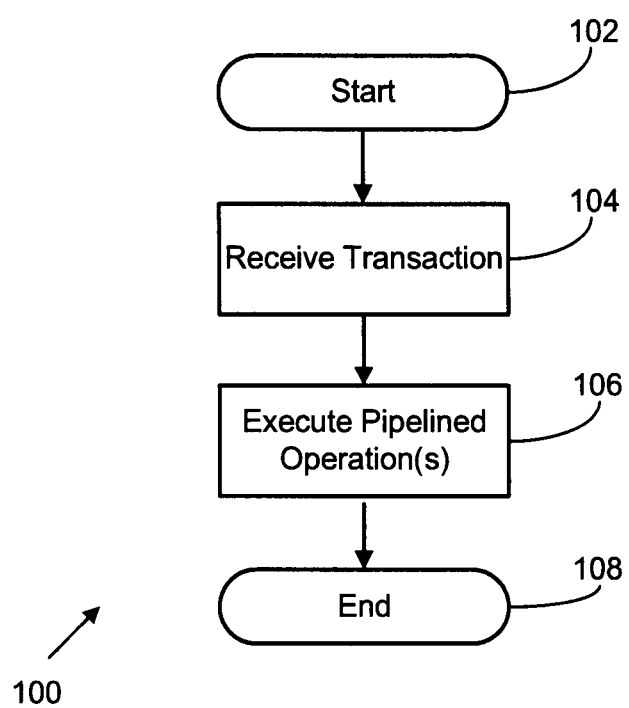
FIG. 3 shows systems and methods for transaction packet processing according to a possible embodiment of the present disclosure.

Referring now to FIG. 3, systems and methods for transaction packet processing are shown according to a possible embodiment of the present disclosure. The system 100 disclosed operates at a communication channel interface which is connected to a serial communication channel, such as a system bus operable to transmit data among computing subsystems. Operational flow within the system 100 is instantiated at a start operation 102, which corresponds to initial receipt at the serial interface of an inbound or outbound transaction. Example inbound or outbound transactions can include read transactions, write transactions, messages, or other data/control signal sharing among systems interconnected by the communication channel.

Operational flow proceeds to a transaction receipt module 104. The transaction receipt module 104 may receive header information at a serial interface, such as a PCI express interface, in the case of an inbound transaction. In the case of an outbound transaction, the transaction receipt module 104 may receive transaction information from a system associated with the serial interface for distribution via the communication channel. In either case, the data either begins or ends in a transaction packet, which includes header information and optional data. For example, a transaction packet representing an inbound write transaction will include data to be written to a target address, as well as an address to write the data to. A transaction packet representing a message shared among one or more systems connected via the serial interface may or may not include data, since it may be the case that only control or status signals need be shared among the systems.

Operational flow proceeds to an execution module 106. The execution module 304 executes one or more pipelined operations based on the transaction information. The pipelined operations perform the necessary steps to transmit or receive data at the serial interface. In the case of an inbound transaction, those steps may include pipelined operations to store, read, and decode the header information, as well as to receive, store, and route any data received at the serial interface. Complementary steps are incorporated into the interface for outbound transactions, as described in conjunction with the example embodiment of FIGS. 7-9, below. The execution module 106 separates specific operations for execution, and allows those operations to be performed as the transaction information, such as header information and/or data, becomes available from either the system or the serial interface. Example pipelined operations can include determining a size of the header information, detecting the presence of data, directing the data to one or more buffers, analyzing the header information to determine the command to be executed by the system, or forwarding the command to a destination module. Additional operations are possible as well.

The header information, data, and output of the various operations may be stored in temporary memory, such as pipeline registers or other buffering mechanisms. One example of such an architecture is described below in conjunction with FIGS. 5-8. By separating the transaction processing at the execution module 106 into discrete operations, the serial interface need not delay subsequent transactions by inserting idle characters onto the bus or otherwise delaying data communication. In this manner, the serial interface can be configured to receive transaction packets at the line speed of the communication channel, such as a serial bus.

Operational flow terminates at an end operation 108, which corresponds to completed receipt, processing, and routing of transaction packets within the serial interface.

Figure 4:
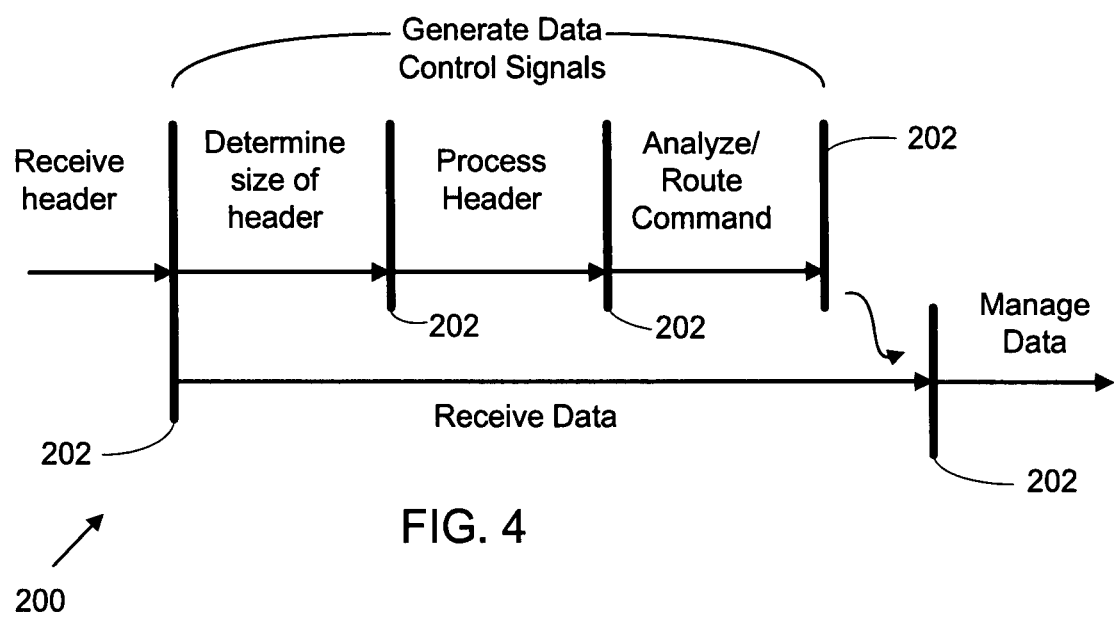
FIG. 4 is an example timing diagram showing execution of the systems and methods of FIG. 3.

FIG. 4 illustrates an example timing diagram 200 showing execution of the systems and methods of FIG. 3 in the case of an inbound command. The timing diagram shows a plurality of pipeline stages 202, with which specific transaction processing operations are executed at a serial interface, as described above. The interface subdivides the transaction packet processing to allow operations to be performed when the header information or data is available for processing, reducing latency within the interface. In the example diagram shown, the operations executed include determining the size of the header information, processing the header information, analyzing and/or routing the command represented within the header information, receiving data, and managing data. Other operations are possible as well.

Figure 5:
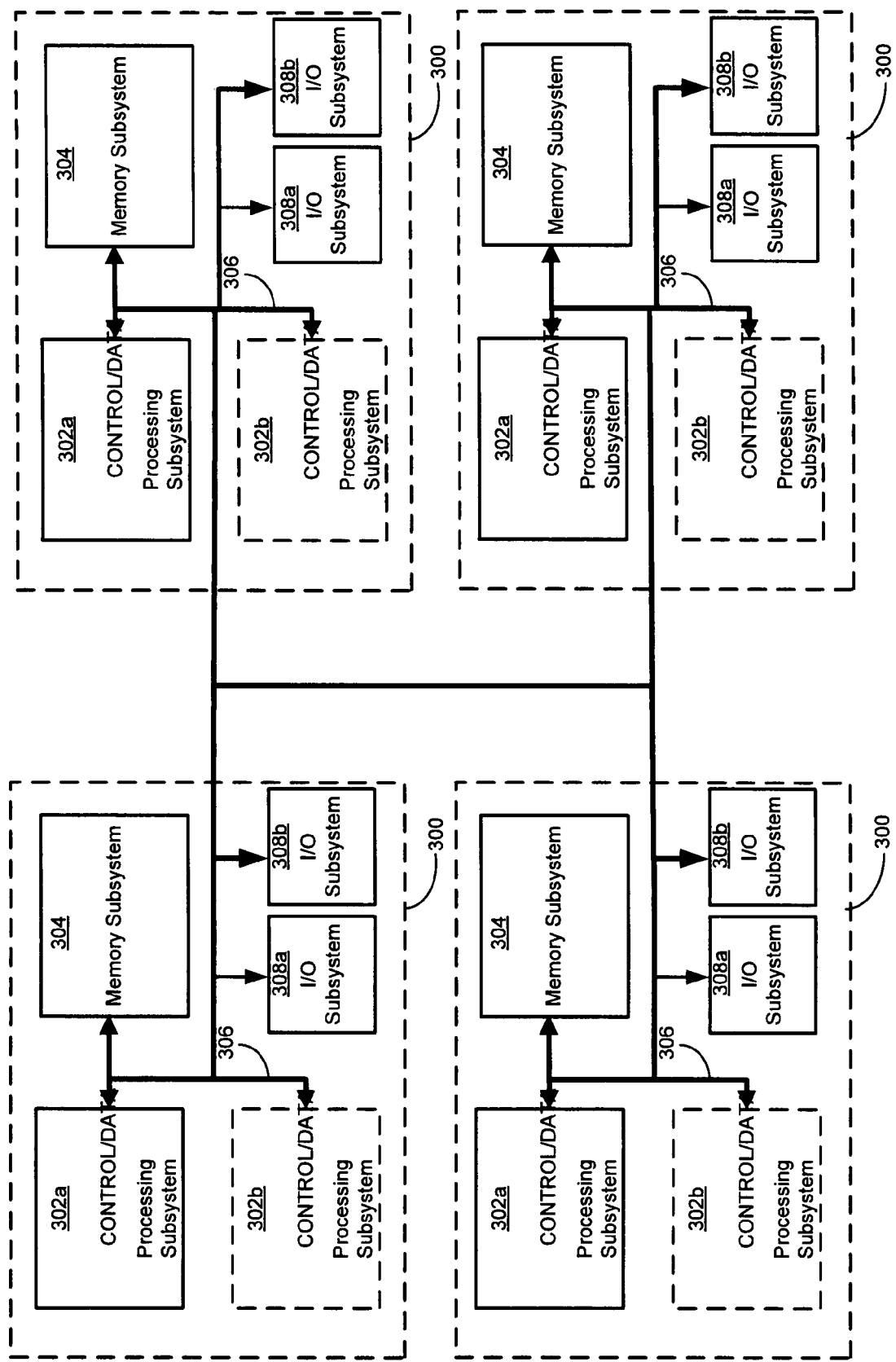
FIG. 5 is a generalized block diagram of a programmable circuit with which aspects of the present disclosure may be implemented.

Referring now to FIG. 5, a generalized block diagram of a system including a plurality of programmable circuits 300 is shown in which aspects of the present disclosure may be implemented. The programmable circuits 300 each include a plurality of processing subsystems 302a, 302b, and a memory subsystem 304, which are interconnected via a communication channel 306. Additional I/O subsystems 308a-b, such as communication interfaces of various types, can be interconnected via the communication channel 306 as well. Furthermore, the programmable circuits 300 are interconnected via the communication channel 306.

Each of the programmable circuits 300 corresponds to one or more sockets, cells or other computing subsystems which may be provided in a common physical or logical package. Optional bus controllers (not shown) interconnect the programmable circuits 300 or components 302a-b, 304, and 308 within each circuit 300. In various embodiments of the multiprocessing system, the communication channel 306 may be implemented using a set of point-to-point serial connections between modules 302 within each programmable circuit 300, a set of point-to-point serial connections between circuits 300, and a set of connections between circuits and one or more system memory modules 304. In such embodiments, the transaction packet processing techniques described herein may be performed by logic implemented in the programmable circuits 300, or may be implemented within each subsystem 302, 304, or 308 within the programmable circuits. The point-to-point interconnections are each an embodiment of one or more of the systems and methods described below in conjunction with FIGS. 7-9.

The programmable circuits 300 may be implemented as a socket or cell system according to various embodiments of the present disclosure. A socket or cell is a set of one or more processors with associated cache memory modules used to perform various processing tasks. These associated cache modules may be implemented as a single level cache memory and a multi-level cache memory structure operating together with a programmable processor. I/O Subsystems 308a-b are connected for use by any tasks executing within system.

While in certain embodiments the programmable circuits 300a-d are depicted as similar, one of ordinary skill in the art will recognize that each circuit may be individually configured to provide a desired set of processing resources as needed.

The processing subsystems 302a, 302b can be any of a number of processing units, programmable logic devices, or other programmable systems configured to execute software instructions. A variety of processing units are available from a variety of manufacturers, for example, Intel Corporation or Advanced Micro Devices, Inc. Although two processing subsystems 302a-b are shown in FIG. 5, more or fewer processing subsystems may be present in an overall programmable circuit 300 according to various embodiments of the present disclosure.

The memory subsystems 304 can be a system memory, cache memory associated with one or more of the processing subsystems 302a-b, or other types of memory. The system or flash memory may be integrated within or separate from another programmable circuit, and can constitute random access memory, flash memory, register memory, or other types of memory. In addition, the memory subsystems 304 may be more than one type of memory device, such as a combination of cache memory and system memory, and may include other data storage devices. The memory subsystems 304 form a unified memory system, in that the entire memory subsystem is accessible by a single memory addressing scheme, where each address refers to a location within one or more memory devices.

In one embodiment, memory subsystem 304 provides data caching memory structures using cache lines along with directory structures and control modules. A cache line used within a programmable circuit 300 may correspond to a copy of a block of data that is stored elsewhere within the address space of the overall system. The cache line may be copied into a processing subsystem's cache memory by the memory subsystem 304 when it is needed by a processing subsystem 302 of the corresponding programmable circuit 300. The same cache line may be discarded when the processing subsystem no longer needs the data. Data caching structures may be implemented for systems that use a distributed memory organization in which the address space for the system is divided into memory blocks that are part of the memory subsystems 304 distributed through the programmable circuits 300. Data caching structures may also be implemented for systems that use a centralized memory organization in which the memory's address space corresponds to a large block of centralized memory of a memory subsystem 304.

The memory subsystem 304 and optional additional data control and routing logic controls access to and modification of data within cache lines held within a programmable circuit 300, as well as the propagation of any modifications to the contents of a cache line to all other copies of that cache line within the overall system. The memory subsystem 304 optionally uses a directory structure (not shown) to maintain information regarding the cache lines currently in used by a particular processor of its sockets. Other memory subsystems 304 associated with other of the programmable circuits 300 perform similar functions for those circuits.

Other configurations of the processing subsystems, memory subsystems, and communication channel are possible as well, beyond that depicted in FIG. 5. For example, certain memory subsystems may be directly controlled by one or more of the processing subsystems, such as in the case of a dedicated cache memory. Additional memory or system components can be included within the programmable circuit as well.

Furthermore, one of ordinary skill in the art will recognize that additional components, peripheral devices, communications interconnections and similar additional functionality may also be included within overall system without departing from the spirit and scope of the present invention as recited within the attached claims. The embodiments of the invention described herein are implemented as logical operations in a programmable circuit, such as a computing system having connections to a distributed network such as the Internet. The system can thus serve as either a stand-alone computing environment or as a server-type of networked environment. The logical operations are implemented (1) as a sequence of computer implemented steps running on a computer system and (2) as interconnected machine modules running within the computing system. This implementation is a matter of choice dependent on the performance requirements of the computing system implementing the invention. Accordingly, the logical operations making up the embodiments of the invention described herein are referred to as operations, steps, or modules. It will be recognized by one of ordinary skill in the art that these operations, steps, and modules may be implemented in software, in firmware, in special purpose digital logic, and any combination thereof without deviating from the spirit and scope of the present invention as recited within the claims attached hereto.

The term programmable circuit, as used herein, encompasses various specialized or general purpose computing systems, such as those capable of receiving and executing instructions from communication media. Combinations of programmable circuits and communication media can thereby execute the methods and systems described herein. Additional exemplary programmable circuits, and systems in which they are employed, are described in greater detail below in conjunction with FIGS. 6-8.

Figure 6:
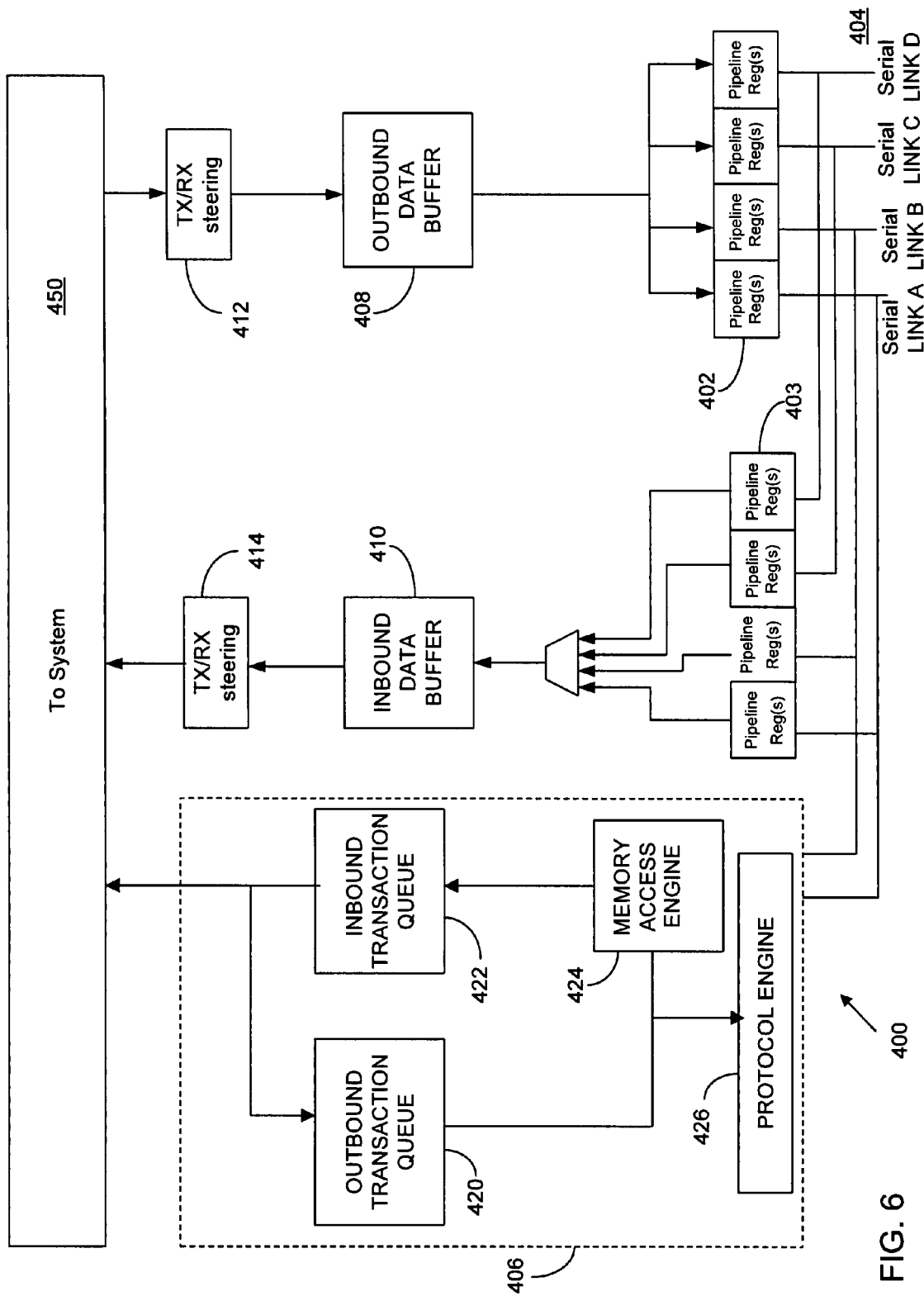
FIG. 6 is a block diagram of a multi-channel communication interface according to a possible embodiment of the present disclosure.

FIG. 6 is a block diagram of a multi-channel communication interface 400 according to a possible embodiment of the present disclosure. The interface 400 provides transaction packet processing between one or more serial channels 404 and a system 450. In one embodiment, the serial channels 404 represent links in a PCI Express interface. Specific operation of a channel of the interface 400 is described in greater detail in conjunction with the interface 500 of FIG. 7, below; however, the interface 400 of FIG. 6 illustrates a system in which multiple channels of serial data communication can be coordinated.

In the embodiment shown, the interface 400 includes outbound pipeline registers 402 and inbound pipeline registers 403 associated with one or more queue pipe modules 406. Each queue pipe module 406 contains an outbound transaction queue 420 and an inbound transaction queue 422, configured to route inbound and outbound read and write operations between the system 450 and the serial communication channels 404. An optional memory access engine 424 controls direct access to a system memory within a programmable circuit, such as is shown in FIG. 5. Each queue pipe module 406 further includes a serial transaction protocol engine 426, which controls transaction processing in the queue pipe module 406 based on commands from the system 450 or header information received via the communication channel 404. In a particular embodiment, the interface 400 includes a queue pipe module 406 for each link in the serial channel 404.

The outbound pipeline registers 402 are also communicatively connected to an outbound data buffer 408, and the inbound pipeline registers 403 are also communicatively connected to an inbound data buffer 410. The outbound data buffer 408 stores data received from the system 450 that is to be transmitted via the communication channel 404, prior to storage in the pipeline registers 402. A steering module 412 is communicatively connected to the input of the outbound data buffer 408, and routes data from the system 450 to the outbound data buffer 408 for transmission. The inbound data buffer 410 receives assembled data from a transaction packet received on a communication channel 404, as passed to it from one or more of the pipeline registers 403. A second steering module 414 is communicatively connected to the output of the inbound data buffer 410, and acts to steer the data to the appropriate location in the system 450.

Figure 7:
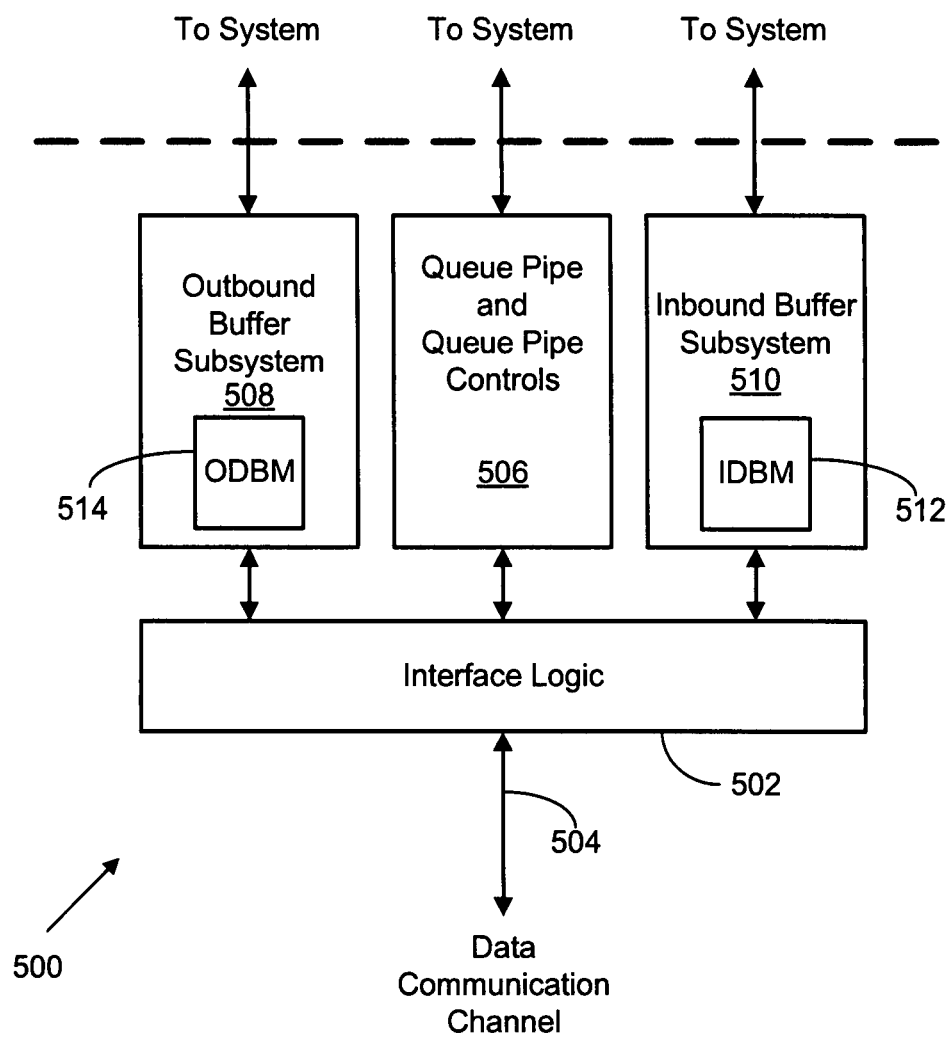
FIG. 7 is a block diagram of an example communication channel interface according to a possible embodiment of the present disclosure.

Referring now to FIG. 7, a block diagram of a generalized communication interface 500 is shown which is capable of implementing various aspects of the present disclosure. The communication channel interface 500 corresponds to an interface to a single channel communication system; multi-channel communications system may include additional logic related to data sharing and switching between the various channels of the interface to manage data loads within each of the channels, such as is described above in conjunction with FIG. 6. The interface 500, as shown, is generally configured to manage inbound and outbound data transfers between a system (such as described in FIG. 5), such as a system memory or microprocessor and associated cache as described above, and a data communication channel, such as a PCI Express or other serial data communication channel.

The interface 500 includes interface logic 502 configured to receive transaction packets from a data communication channel 504. The interface logic 502 is operably connected to a queue pipe subsystem 506, an outbound buffer subsystem 508, and an inbound buffer subsystem 510, the operation of each of which is discussed in greater detail below. The interface logic 502 is generally configured to receive, validate, and route header information and other data in a transaction packet received from a communication channel 504, and route that data via an inbound buffer subsystem 510 to the system. Examples of such data packets include inbound read and write transactions incorporated into one or more transaction packets. The interface logic 502 is further configured to receive data from a system component via an outbound buffer subsystem 508 and distribute that data, for example outbound read and write transactions from the system, on the communication channel 504 to a remote system. Remote systems may include, for example, other programmable circuits or peripheral components. A high level block diagram of interface logic is described below in conjunction with FIG. 8.

The queue pipe subsystem 506 generally receives inbound header information received from the interface logic 502, and performs a variety of memory management and data synchronization tasks with respect to the possible transactions represented by the header information. The queue pipe subsystem 506 can include one or more queue pipes associated with memory access management, which are configured to interface with one or more memory subsystems. Example logical blocks of a single queue pipe subsystem related to the inbound write requests contemplated by the present disclosure are described in conjunction with FIG. 9, below.

The outbound buffer subsystem 508 and the inbound buffer subsystem 510 each include a buffer and control logic. In the outbound buffer subsystem 508, the buffer and control logic are configured to synchronize outbound data to be compiled into a transaction packet and output on the data communication channel 504. In the inbound buffer subsystem 510, the buffer and control logic are configured to synchronize inbound data with inbound header information to properly route the data to perform inbound read and write operations.

The inbound buffer subsystem 510 includes, in certain embodiments, an inbound data buffer manager 512, which acts to manage access to the buffer memory in the inbound buffer subsystem 510. The inbound data buffer manager 512 manages the inbound buffer resources, and stores header information to correspond the header information with the data with which it was received in a transaction packet. Additionally, the inbound data buffer manager 512 tracks inbound writes, such as by using a transaction identifier stored with the inbound data, so as to flush the appropriate portions of the inbound buffer resources when an inbound write is canceled. The inbound data buffer manager 512 can perform additional operations for managing inbound data as well.

In certain embodiments, the outbound buffer subsystem 508 includes an outbound data buffer manager 514, which also acts to manage access to the buffer memory in the outbound buffer subsystem 508. The outbound data buffer manager 514 manages outbound buffer resources, as data is received from a memory. The output of the outbound data buffer manager 514 is to be combined with header information for transmission via interface logic 502 on the data communication channel 504. The outbound data buffer manager 514 can perform additional operations for managing outbound data as well.

Figure 8:
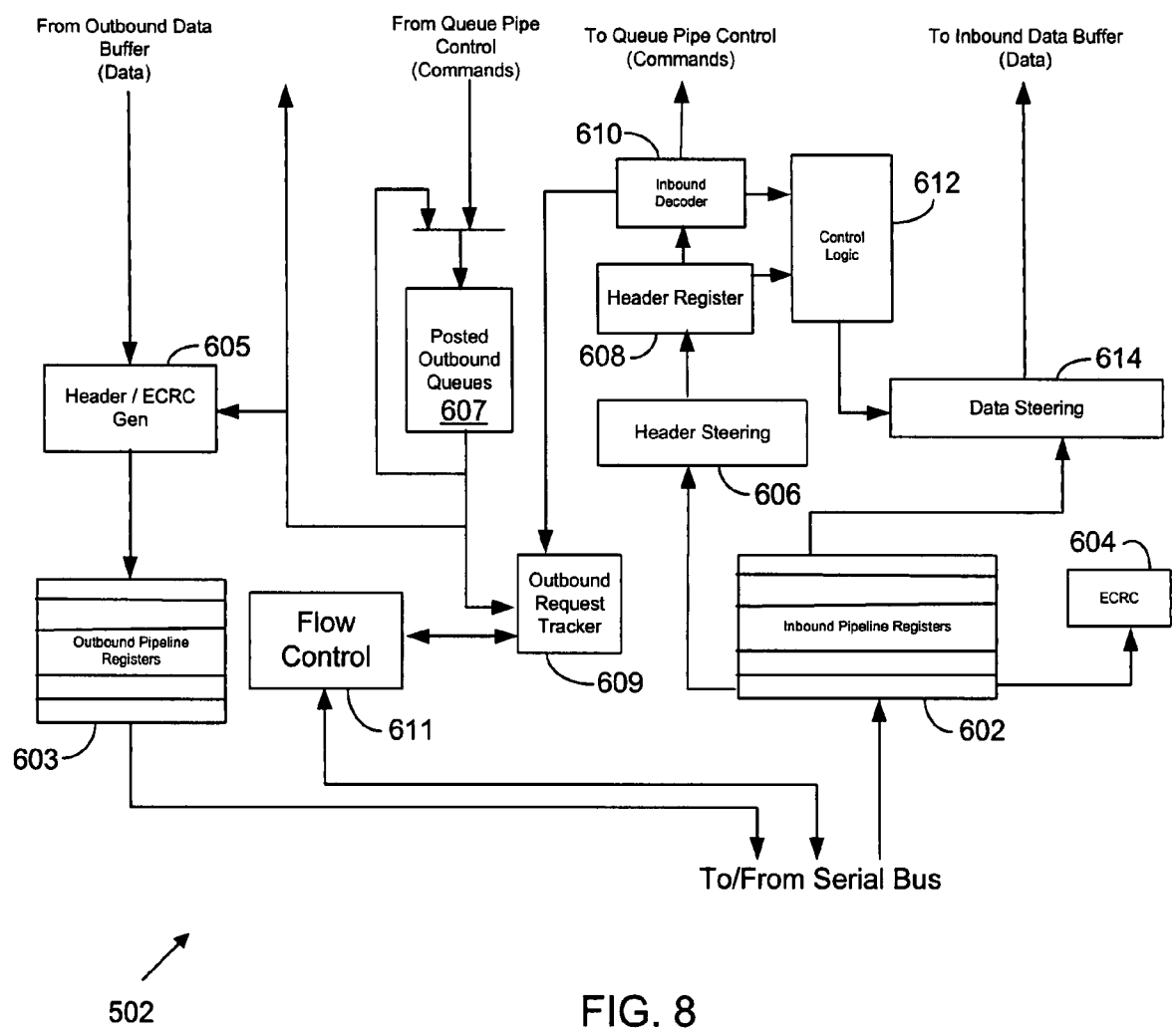
FIG. 8 is a block diagram of interface logic used in the communication channel interface of FIG. 7.

FIG. 8 is a block diagram of interface logic 502 used in the communication channel interface of FIG. 7. The interface logic 502 manages inbound and outbound transaction packet flow, assembling outbound transaction packets for transmission on the communication channel 504 and disassembling inbound transaction packets for receipt by a system incorporating the interface 500.

With respect to inbound transactions, the interface logic 502 provides flow control, strips or adds a transaction layer header to/from the transaction packet, and checks and adds error detection and correction logic and data to the packet. The interface logic shown illustrates the basic functionality used to direct inbound transactions to either the queue pipe subsystem 506 or the inbound buffer subsystem 510 of FIG. 7. The interface logic includes an inbound register system 602, with an associated error detection and correction module 604. The transaction packet received at the interface 502 on the serial communication channel is stored in the inbound register system 602. The inbound register system 602 can include one or more data registers useable to collect and parallelize the transaction packets received at the interface. The error detection and correction module 604 detects and corrects errors in the transaction packet once the entire packet is received at a register. Any of a number of error detection and correction schemes may be used by the error detection and correction module 604, such as a checksum or other methods.

A header steering module 606 receives header information from the inbound register system 602 once the header information is received from the communication channel. The header steering module 606 directs the header information into a header register 608, which stores the header information and routes it into an inbound header decode module 610 and a data steering logic module 612. The inbound header decode module 610 determines the type of operation to be performed based on the header information, based on an opcode stored within the header. In the methods and systems described herein, the relevant transaction is an inbound write transaction to a memory accessible to the system shown in FIG. 7. However, in the context of header information received as part of a transaction packet, additional transaction types are possible as well. The inbound header decode module 610 routes the decoded header information, now representing a specific transaction understood by the system to which the interface 500 of FIG. 7 is connected, to a queue pipe selector (not shown) which selects a specific queue pipe and routes the decoded header information into that queue pipe. Example queue pipe logic is described below in conjunction with FIG. 9.

The data steering logic module 612 provides a control input to a data steering module 614. The data steering module 614 receives data from the register system 602, and aligns that data as appropriate for transmission to the inbound buffer subsystem 510.

With respect to outbound transactions, the interface logic 502 provides flow control, adds a transaction layer header to the transaction packet, and adds error detection and correction logic and data to the packet. The interface logic 502 shown illustrates the basic functionality used to direct outbound transactions from the queue pipe subsystem 506 and the outbound buffer subsystem 510 and onto the communication channel 504 of FIG. 7. The interface logic includes an outbound register system 603, with an associated header and error detection generation module 605.

The data received at the interface 502 from the outbound data buffer subsystem 508 of FIG. 7 is stored in the outbound register system 603. The outbound register system 603 can include one or more data registers useable to collect and assemble the transaction packets received at the interfaces for serialization along a communication channel, such as the serial bus as shown. The header and error detection generation module 605 generates header and error correction bits for inclusion in a transaction packet, to be added to the transaction packet in the register system 603. Any of a number of error detection and correction schemes may be used, such as a checksum or other methods. Preferable, the error detection and correction scheme used by the module 605 is complementary to the scheme employed by the module 604 for detecting errors.

A plurality of posted outbound queues 607 hold transactions destined to be transmitted on the communication channel. The posted outbound queues 607 can include, in certain embodiments, a posted request queue, a non-posted request queue, and a completion queue. The posted request queue contains posted transactions, such as memory writes or messages. The contents of this queue may be used, for example, to generate the header information to be used for posted transactions. The non-posted request queue contains non-posted transactions, such as memory read transactions, I/O transactions, and configuration read/write transactions. The completion queue contains completions to be transmitted on the communication channel. Completions correspond to messages among systems interconnected at the communication channel indicating, for example, responses to data requests or other messages.

Optionally, if one or more of the posted outbound queues 607 are full, outbound transaction dispatch logic (not shown) will control ordering of the posted, non-posted, and completion requests by giving precedence to the posted requests until the posted request queue is empty. The outbound transaction dispatch logic also arbitrates among the various outbound queues 607 to select the next outbound action to be transmitted via the communication channel.

An outbound request tracking module 609 tracks completion of outbound requests to determine, for example, when data requested from a remote programmable circuit is received on the serial interface. The outbound request tracking module 609 matches completions to stored transactions to retire transactions as execution of that transaction successfully ends. In one possible embodiment, the module 609 can be configured to determine that a transaction has encountered an error if a predetermined amount of time has passed after issuance of a transaction, assuming no completion message is received. In a further embodiment, this timeout feature can be disabled via a register setting in the module 609. In a still further embodiment, the module 609 locally regenerates the transaction to be transmitted on the communication channel a predetermined number of times prior to determining that an unrecoverable failure has occurred.

Corresponding control signals to one or more types of transactions managed on the output portion of the serial interface 502 may be generated as well. For example, unsuccessfully completed transactions must be removed from the various outbound queues 607 and the tracking module 609, and, as necessary, an error signal may be sent back to the system to indicate a failed transaction.

A flow control module 611 tracks and updates the data flow within the interface logic 502. The module 611 is responsible for the flow control initialization protocol as well as updates, by communicating with the outbound request tracking module 609 and the inbound and outbound buffer managers 512, 514. In certain embodiments, the flow control module 611 contains separate state machines related to inbound and outbound transactions. The module 611, and optional state machines, may use "credits" to manage and balance transaction loads on the communication channel. The inbound state machine receives outbound flow control credits, while the outbound state machine receives inbound flow control credits. Various credit use schemes may be employed to ensure balance and management of inbound and outbound transactions.

Additional functionality and control signals may be incorporated into the interface logic 502 as well, depending upon the length of the data received in the register system 602, the size of the buffer memory in which the data is stored, tracking information for the data, and the size of the memory block to be written to. For example, idle states and request flushing commands may be needed, as errors occur within the interface or on the communication channel. Other factors may dictate additional or modified functionality as well, with respect to inbound or outbound transactions.

Figure 9:
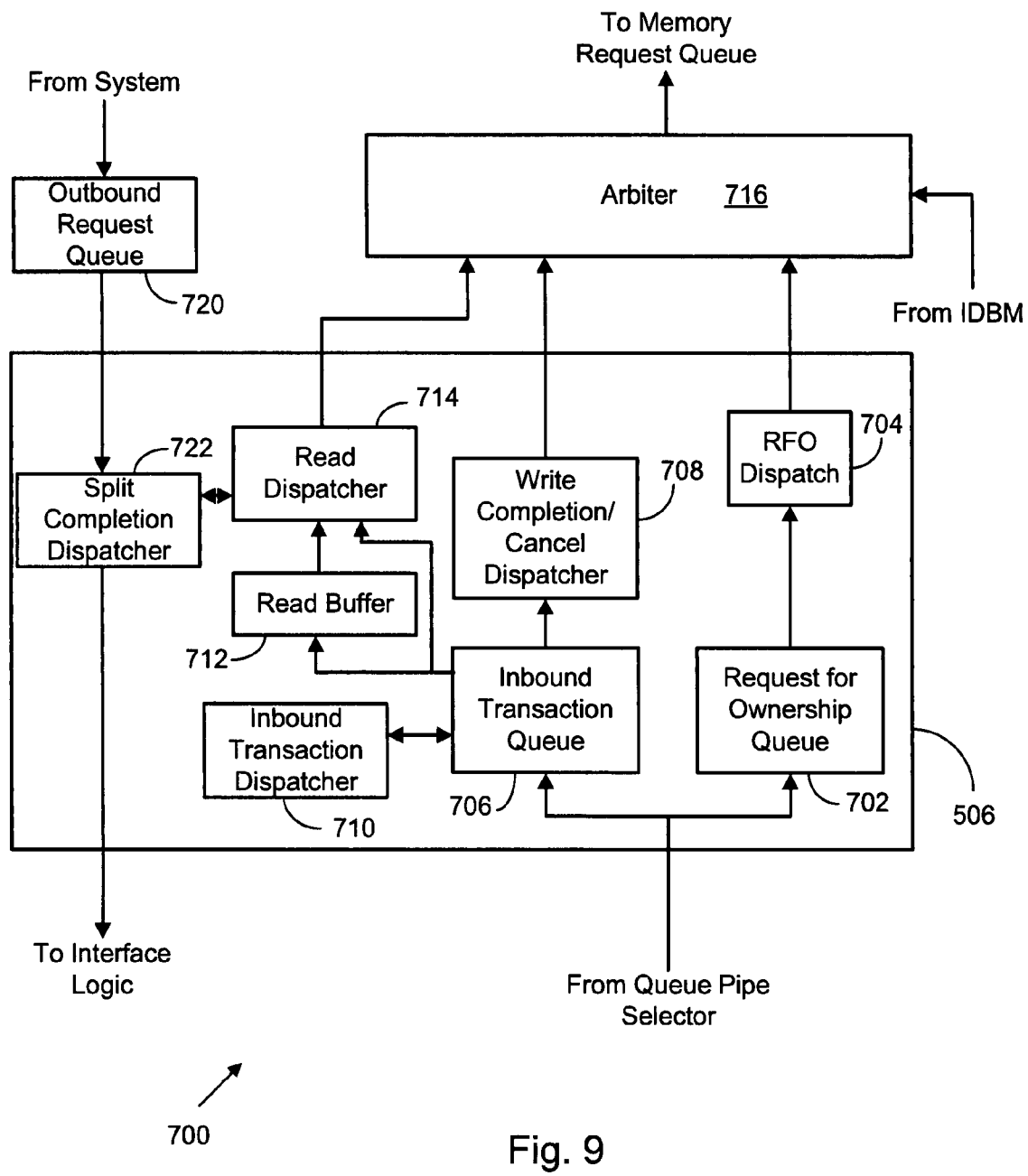
FIG. 9 is a block diagram of queue pipe control system used in the communication channel interface of FIG. 7.

FIG. 9 is a block diagram of queue pipe control system 700 usable in the communication channel interface of FIG. 7. The queue pipe control system 700 includes aspects of the queue pipe subsystem 506 of FIG. 7, and includes additional logic configured to control inbound and outbound transaction flow, as described below.

The portions of the queue pipe control system 700 included in the queue pipe subsystem 506 and related to inbound writes include a request for ownership queue 702, a request for ownership dispatcher 704, an inbound transaction queue 706, and a write completion/cancellation dispatcher 708. The request for ownership queue 702 is a transaction buffer which stores all transactions requesting ownership of a memory for the purpose of writing to that memory. The request for ownership dispatcher 704 retrieves the entry at the head of the request for ownership queue 702 and generates one or more requests for ownership to be sent to a memory by an arbiter module 714, described below. In various embodiments, the number and type of requests generated is based on the length and address of the memory write. In further embodiments, the request for ownership dispatcher 704 can further dispatch a pointer to data in the inbound buffer subsystem 510 corresponding to the write transaction, pending the receipt of that data on the communication channel 504 and the existence of the data within the inbound buffer subsystem 510.

The inbound transaction queue 706 contains a queue of inbound transactions, excluding requests for ownership, as received from the interface logic 502 and routed to the queue pipe subsystem 506 via the queue pipe selector (not shown). The inbound transaction queue 706 is a register array sized to receive write transactions, read transactions, completion transactions, and request for ownership cancellation transactions. Other transactions are possible as well.

Each request for ownership passing through the request for ownership queue 702 has a corresponding write transaction or request for ownership cancellation transaction passing through the inbound transaction queue, which are passed to the arbiter such that the transaction can be completed and retired. With respect to the request for ownership cancellation transactions (RFOc transactions), the RFOc transaction must follow the path of the write transactions to avoid potential deadlocks which could occur if RFOc were to follow the corresponding request for ownership into the request for ownership queue 702.

The write completion/cancellation dispatcher 708 processes the inbound write and request for ownership cancellation requests. These requests are broken down by the write completion/cancellation dispatcher 708 to memory granularity-sized requests by this module. For example, if the memory subsystem being written to is a cache memory, the memory granularity may be a cache line. Other granularities and request configurations are possible as well. The dispatcher 708 tracks the number of pending memory ownership requests, and controls the number of pending memory ownership requests which are allowed to remain outstanding. In one example, the dispatcher 708 includes one or more up-down counters that it uses to determine if it can make a request. One of the counters is incremented when a request is sent from the request for ownership dispatcher 704 and is decremented when a request for ownership cancellation or write operation is dispatched from the write completion/cancellation dispatcher 708. The second counter is incremented when a write is issued to the arbiter 716 and is decremented when a write completion is output from the arbiter. Write ownership control can be altered, for example, by changing the size and characteristics of this second counter. Strongly ordered write requests require this second counter to be at zero before a write can be issued, which indicates that the dispatcher 708 strongly orders the write operations and does not allow multiple requests for ownership to occur prior to data being written to memory and the write transaction retired.

The portions of the queue pipe control system 700 included in the queue pipe subsystem 506 and related to inbound reads or other messages include an inbound transaction dispatcher 710, a read buffer 712, and a read dispatcher 714. The inbound transaction dispatcher 710 is configured to route and manage all inbound messages or other transactions. The read buffer 712 contains buffered read transactions which are stored so as to perform read requests as system memory becomes available for a read transaction. The read dispatcher 714 operates in conjunction with the read buffer 712 to coordinate and reorder, as necessary, inbound read transactions to be transmitted to the arbiter 716. Read transactions may be ordered based on the size of the data to be read; for example, long read transactions may be held in the buffer 712 to allow other transactions to execute, while short read transactions may be interleaved with other transactions. Other implementations are possible as well.

The arbiter 716 receives requests for ownership, write transactions, read transactions, and requests for ownership cancellation from the queue pipe subsystem 506. Specifically for write transactions, the arbiter 716 receives requests for ownership from the request for ownership dispatcher 704 and receives write completion or cancellation signals from the write completion/cancellation dispatcher 708. The arbiter 716 further receives control signals from the inbound data buffer manager 512 of FIG. 7, which it uses in conjunction with the requests for ownership received from the request for ownership dispatcher 704 to manage the various queue pipes and allows the write request from the queue pipe subsystem 506 to be associated with the corresponding data stored in the inbound buffer subsystem 510. In certain embodiments, additional operations may be performed by the arbiter 716 as well, such as management and organization of queue pipes during request for ownership cancellation transactions.

For read requests, the arbiter 716 receives the read requests from the read dispatcher 714 and transmits those requests to the memory request queue as well. The arbiter 716 manages interleaving of read and write requests received from the queue pipe subsystem 506. Responsive data to a read request can be provided to the output data buffer subsystem 508 of FIG. 7, as described above. Other implementations for execution of read requests are possible as well.

The portions of the queue pipe control system 700 related to outbound transactions includes an outbound request queue 720 and a split completion dispatcher 722. The outbound request queue 720 holds outbound request transactions received from the system using the interface 500 of FIG. 7. The outbound request transactions are transmitted, via the split completion dispatcher 722, to the posted outbound queues 607 of FIG. 8, where they are held until converted into header information to be included in a transaction packet for transmission on the communication channel. The split completion dispatcher 722 receives data from inbound requests to determine the appropriate time for the interface system 700 to generate a completion transaction. The split completion dispatcher 722 determines whether an inbound read command is performed successfully, and generates a completion transaction to accompany responsive data on the communication channel.

Figure 10:
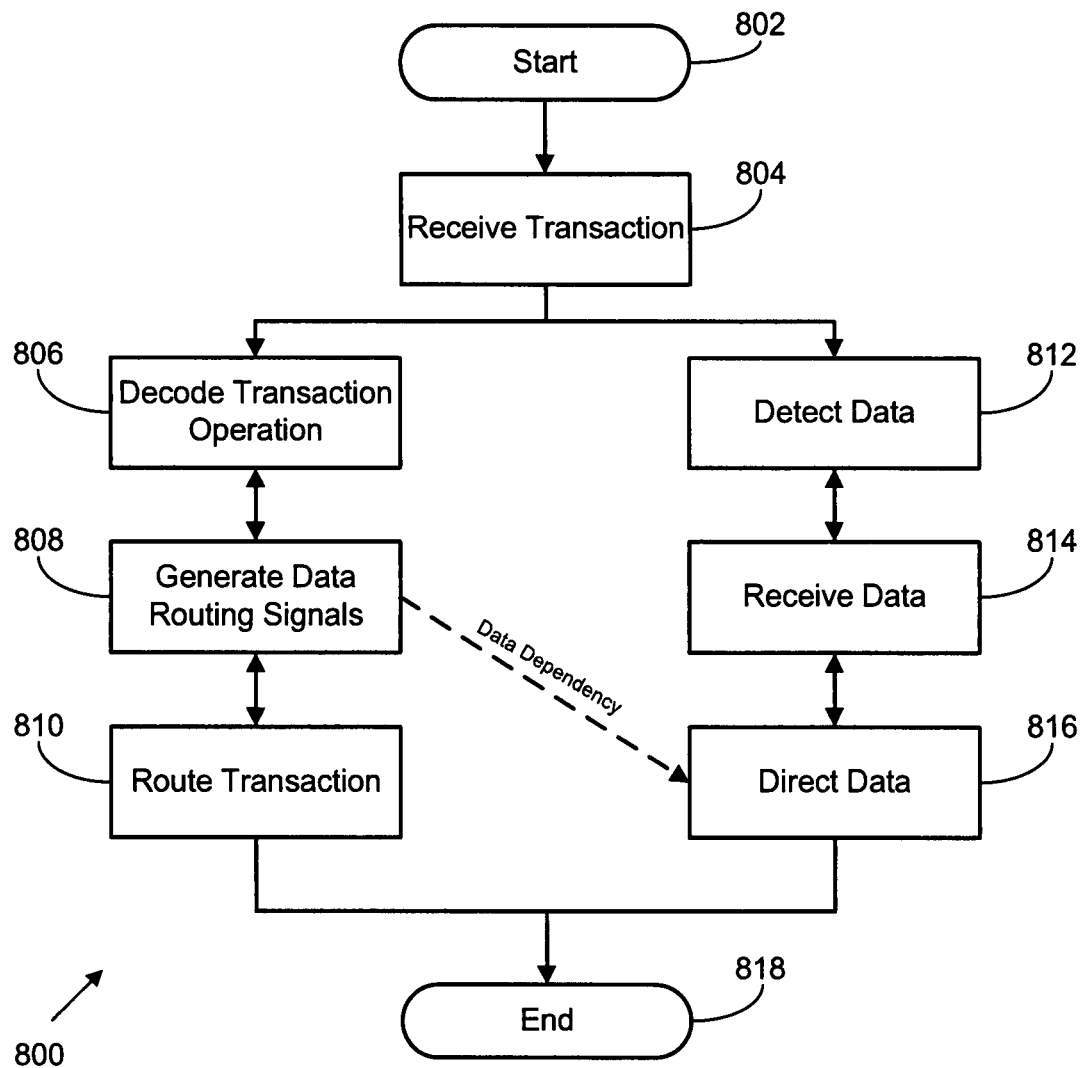
FIG. 10 shows systems and methods for transaction packet processing according to a particular embodiment of the present disclosure.

FIG. 10 shows systems and methods for transaction packet processing according to a particular embodiment of the present disclosure. The system 800 disclosed operates at a communication channel interface which is connected to a serial communication channel, such as a serial bus operable to transmit data among computing subsystems. In a particular embodiment, the system 800 is operable partially or wholly within the interface logic 600 and queue pipe control system 700 as described above in conjunction with FIGS. 8-9. The various modules described below correspond to functional operation of the serial interface, and may be performed by one or more of the functional units previously described in FIGS. 6-9. The modules of FIG. 10 may in fact be performed by different modules, depending on whether the transaction is an inbound or outbound transaction. Other possible combinations and distributions of functionality within the serial interface are possible as well, consistent with the present disclosure.

Operational flow within the system 800 is instantiated at a start operation 802, which corresponds to initial receipt at the serial interface of an inbound or outbound transaction. Example inbound or outbound transactions can include read transactions, write transactions, messages, or other data/control signal sharing among systems interconnected by the communication channel. Operational flow proceeds to a transaction receipt module 804. The transaction receipt module 804 corresponds generally to the transaction receipt module 104 of FIG. 3, in that it receives header information at a serial interface, such as a PCI express interface. As previously described, the transaction can be a command received from a system, or can be a transaction packet, which may include header information and data.

Operational flow proceeds to a plurality of independent pipelined modules configured to perform operations on the transaction packet, as dictated by the command or header information. A transaction decode module 806 receives the transaction from the transaction receipt module 804 and can determine the type of transaction to be performed. In the case of an inbound transaction, the transaction decode module 806 can, for example, decode header information received in a serial transaction packet received on the communication channel with which the serial interface is associated. In the case of an outbound transaction, the decode transaction operation can generate header information to be used in a serial transaction packet.

A routing signal generation module 808 receives the transaction as well, and is configured to generate data routing signals for use by the serial interface. The data routing signals can be used, for example, to route inbound or outbound data to a proper buffer for transmission between a system and the communication channel.

A command routing module 810 routes the transaction information to an appropriate location for upstream/downstream usage, depending upon the type of transaction to be performed. For inbound transactions, the command routing module 810 corresponds to routing decoded header information to the system for use in retrieving or storing data, transmitting or receiving messages, or other commands. For outbound transactions, the command routing module 810 corresponds to routing encoded header information to correspond to outbound data and placing the header information into an outbound pipeline register for transmission on the serial communication channel.

In addition to the modules 806-810 related to transaction processing, a plurality of modules perform pipelined data processing tasks within the serial interface. A data detection module 812 detects the presence of data at the serial interface, as received from the system or the communication channel. A data receipt module 814 stores the data in an appropriate location for an inbound or outbound data transfer. Inbound data transfers initially store data in an inbound pipeline register, while outbound data transfers initially store data in an outbound data buffer module, such as previously described.

A data direction module 816 directs data from the location in which it is stored by the data receipt module 814 to a location determined based on data routing signals. The data direction module 816 receives control signals from the routing signal generation module 808, and therefore will generally execute after that module does with respect to the same transaction. In the case of inbound data, the data direction module 816 directs data to an inbound data buffer module, using data alignment determined by the routing signal generation module 808. In the case of outbound data, the data direction module 816 directs data to an outbound pipeline register for combination with generated header information to form a transaction packet which may be transmitted on the serial communication channel.

Alternative ordering among the various modules 806-816, and alternative uses and operations of the modules 806-816 are possible as well. Operational flow terminates at an end operation 818, which corresponds to completed processing of the transaction packet.

Figure 2:
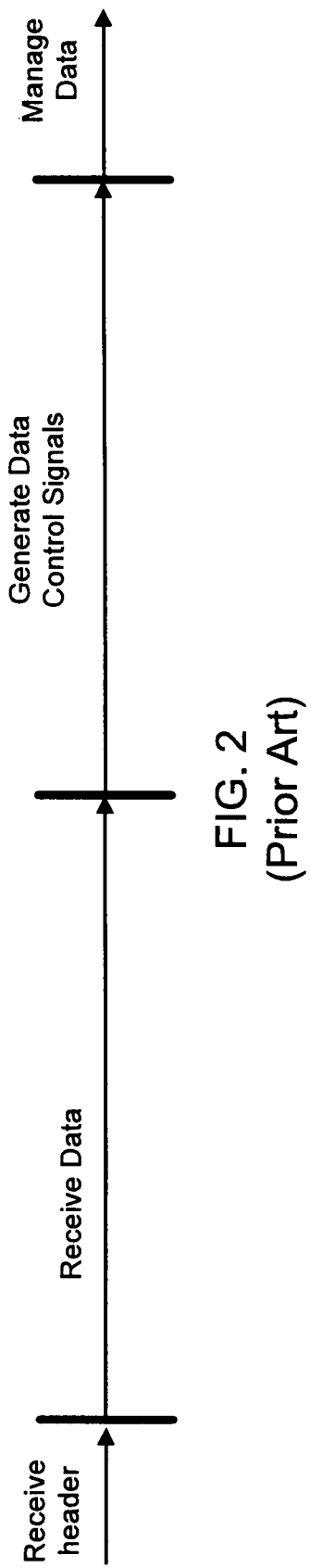
FIG. 2 is an example timing diagram showing execution of the systems and methods of FIG. 1.
Figure 11:
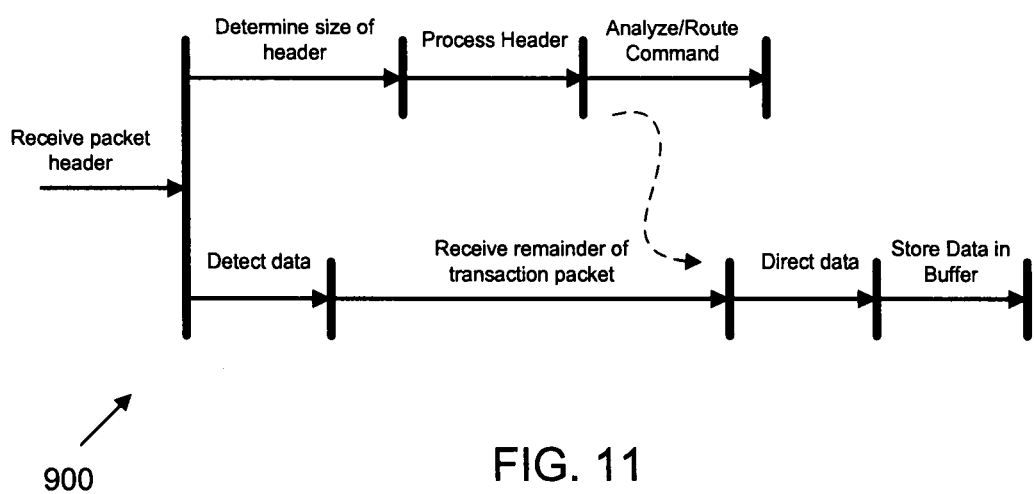
FIG. 11 is an example timing diagram showing execution of the systems and methods of FIG. 9.

FIG. 11 is an example timing diagram 900 showing execution of the systems and methods of FIG. 10. The timing diagram 900 illustrates operation of the system 800 of FIG. 10 for an inbound transaction illustrating the separate pipelined operations allowing the methods and systems herein to be performed at the line speed of a serial communication channel. As illustrated, discrete transactions are performed corresponding to the modules 806-816 of FIG. 10. These discrete transactions (and the data dependency discussed above), are shown to, as compared to the prior art FIG. 2, allow subsequent transactions to not wait on decoding or encoding header information. Rather, the serial interface operates such that header or data information from serial transaction packets can be sent or received by the serial interface on every cycle of the serial communication channel.

The ordering of the various modules described in FIG. 10 and the other figures herein represents only an example execution flow of pipelined operations executed within a transaction interface, such as the interface 500 described in FIGS. 7-9. Ordering of execution of the modules may vary, for example, due to the specific composition and sequence of inbound and outbound transactions to be processed, the size and depth of data queues used to receive and direct data, and other architectural features of the interface. By separating the interface into discrete, independent pipelined operations performed by the various modules as described herein, operational execution depends on data readiness, rather than transaction decoding time. In this way, an interface implemented in a manner consistent with the present disclosure is operable at line speed, meaning that the serial data interface can process transactions as fast as those transactions can occur on a communication channel associated with that interface.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

The invention claimed is:

1. A method of processing transaction packets received on a serial bus, the method comprising:
  receiving transaction packet validation information comprising error detection and correction information, at a serial interface; and
  executing one or more pipelined operations based on the transaction packet validation information, the operations relating to processing of a transaction packet;
  wherein the serial interface is configured to receive transaction packets at a line speed of the serial bus.

2. The method of claim 1, further comprising receiving an entire transaction packet.

3. The method of claim 1, wherein line speed corresponds to receipt or transmission of a transaction packet on subsequent clock signals of a serial bus, in the absence of intervening idle characters.

4. The method of claim 1, wherein the serial interface is a PCI Express compatible interface.

5. The method of claim 1, further comprising storing the transaction information in a pipeline register.

6. The method of claim 1, further comprising storing the transaction packet in a pipeline register.

7. The method of claim 1, wherein the one or more operations are selected from the group consisting of:
  determining a size of header information;
  detecting the presence of data;
  directing data to one or more buffers;
  analyzing header information to determine the command to be executed by the system; and
  forwarding a command to a destination module.

8. The method of claim 2, wherein receiving the entire transaction packet comprises receiving header information.

9. The method of claim 2, wherein executing one or more operations based on the header information occurs prior to receiving the entire transaction packet.

10. A serial interface comprising:
  a plurality of independent pipelined logical modules, the logical modules coordinating to execute one or more operations based on header information in each transaction packet received on a serial bus, wherein said header information comprises error detection and correction information, the logical modules including:
  a header processing module configured to determine the size of the header information;
  a command analysis module configured to determine a type of transaction to be performed; and
  a data direction module configured to direct data from the transaction packet to an inbound data buffer;
  wherein the serial interface is configured to receive transaction packets at line speed with respect to the serial bus.

11. The serial interface of claim 10, wherein the serial interface is configured to receive one or more transaction layer packets at the speed of the serial bus.

12. The serial interface of claim 10, wherein the serial interface is a PCI Express compatible interface.

13. The serial interface of claim 10, wherein the logical modules further include a data detection module configured to detect the presence of data in a transaction packet.

14. The serial interface of claim 10, wherein the logical modules further include a command forwarding module configured to transfer a command from the serial interface based on the type of transaction to be performed.

15. The serial interface of claim 10, wherein line speed corresponds to receipt of a transaction packet on subsequent clock signals of a serial bus, in the absence of intervening idle characters.

16. A serial interface comprising:
  a plurality of independent pipelined logical modules, the logical modules coordinating to execute one or more operations to form a transaction packet to be transmitted on a serial bus, the logical modules including:
  a header processing module configured to generate header information, including transaction packet validation information comprising error detection and correction information, for a serial transaction packet;
  an outbound data buffer configured to receive and store data for transmission in the serial transaction packet;
  a register system configured to store formed transaction packets based on the header processing module and the outbound data buffer;
  wherein the serial interface is configured to transmit transaction packets at line speed with respect to the serial bus.

17. The serial interface of claim 16, wherein line speed corresponds to transmission of transaction packet data on subsequent clock signals of a serial bus, in the absence of intervening idle characters.

18. The serial interface of claim 16, wherein the serial interface is a PCI Express compatible interface.

19. The serial interface of claim 16, wherein the transaction packet is stored in the register system prior to transmitting the transaction packet.

20. A serial interface comprising:

a plurality of independent pipelined logical modules, the logical modules coordinating to execute one or more operations based on header information in each transaction packet received on a serial bus, the logical modules including:

a register system configured to store at least one transaction packet;

a header processing module configured to determine header information associated with the transaction packet, wherein said header information includes transaction packet validation information comprising error detection and correction information;

a data direction module configured to direct data from the transaction packet to a data buffer based on the header information;

wherein the serial interface is configured to send and receive transaction packets at line speed with respect to the serial bus.

21. The serial interface of claim 20, wherein line speed corresponds to receipt or transmission of transaction packet data on subsequent clock signals of a serial bus, in the absence of intervening idle characters.

22. The serial interface of claim 20, wherein the register system receives the at least one transaction packet from a data communication channel.

23. The serial interface of claim 20, wherein the header processing module generates header information based on a type of transaction to be transmitted on a data communication channel.

24. The serial interface of claim 20, wherein the header processing module decodes header information to determine a type of transaction to be performed using the transaction packet.

25. The serial interface of claim 20, wherein the data buffer is an inbound data buffer.

26. The serial interface of claim 20, wherein the data buffer is an outbound data buffer.

\* \* \* \* \*